United States Patent
Shibata et al.

(10) Patent No.: US 9,230,181 B2
(45) Date of Patent: Jan. 5, 2016

(54) HANDWRITTEN DOCUMENT RETRIEVAL APPARATUS AND METHOD

(71) Applicant: Kabushiki Kaisha Toshiba, Tokyo (JP)

(72) Inventors: Tomoyuki Shibata, Kawasaki (JP); Yojiro Tonouchi, Inagi (JP); Kazunori Imoto, Kawasaki (JP); Yasunobu Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 13/837,333

(22) Filed: Mar. 15, 2013

(65) Prior Publication Data

US 2013/0315483 A1 Nov. 28, 2013

(30) Foreign Application Priority Data

May 28, 2012 (JP) ................................. 2012-121305

(51) Int. Cl.
 *G06K 9/00* (2006.01)
(52) U.S. Cl.
 CPC .................................. *G06K 9/00865* (2013.01)
(58) Field of Classification Search
 None
 See application file for complete search history.

(56) References Cited

U.S. PATENT DOCUMENTS

| | | | |
|---|---|---|---|
| 5,832,474 A | 11/1998 | Lopresti et al. | |
| 6,108,444 A * | 8/2000 | Syeda-Mahmood | 382/186 |
| 7,218,779 B2 | 5/2007 | Dodge et al. | |
| 7,593,961 B2 | 9/2009 | Eguchi et al. | |
| 2006/0210162 A1* | 9/2006 | Sato | 382/176 |
| 2007/0143272 A1 | 6/2007 | Kobayashi | |

FOREIGN PATENT DOCUMENTS

| | | |
|---|---|---|
| CN | WO2012024829 A1 * | 3/2012 |
| JP | 10-055371 A | 2/1998 |
| JP | 2004-227564 A | 8/2004 |
| JP | 2004-348706 A | 12/2004 |
| JP | 2007-065763 A | 3/2007 |
| JP | 2007-164648 A | 6/2007 |
| JP | 2009-230427 A | 10/2009 |
| JP | 2010-009426 A | 1/2010 |

OTHER PUBLICATIONS

Yann Leydier, Asma Ouji, Frank LeBourgeois, and Hubert Emptoz. Towards an omnilingual word retrieval system for ancient manuscripts. Pattern Recognition, 42(9):2089-2105, Sep. 2009.*

Notice of Reasons for Rejection mailed by Japan Patent Office on May 7, 2014 in the corresponding Japanese patent application No. 2012-121305—9 pages.

(Continued)

*Primary Examiner* — Utpal Shah
*Assistant Examiner* — Menatoallah Youssef
(74) *Attorney, Agent, or Firm* — Knobbe, Martens Olson & Bear LLP (57) ABSTRACT

According to one embodiment, a handwritten character retrieval apparatus is provided with an acquisition unit, a separation unit, a feature extraction unit and a retrieval unit. The acquisition unit acquires a document including handwriting data. The separation unit separates the document into a plurality of parts. The feature extraction unit extracts feature values, each indicating a feature value of each part. The retrieval unit executes retrieval based on the feature values.

8 Claims, 10 Drawing Sheets

(56) References Cited

OTHER PUBLICATIONS

X.-D. Zhou, et al., "Text/Non-text Ink Stroke Classification in Japanese Handwriting Based on Markov Random Fields", Ninth International Conference on Document Analysis and Recognition pp. 1-5.

K. Imamura et al., "A Method of Dividing Peaks in Histograms Based on Weighted Sequential Fuzzy Clustering", The Journal of the Institute of Image Information and Television Engineers, vol. 61, No. 4, pp. 550-554, 2007.

C.Cheng, et al., "A Discriminative Model for On-line Handwritten Japanese Text Retrieval", International Conference on Document Analysis and Recognition, 2011, pp. 1285-1288.

P. Luangvilay, et al., "An On-line Handwritten Text Search Method based on Directional Feature Matching", International Conference on Document Analysis and Recognition, 2011, pp. 683-686.

X.-D. Zhou, et al., "Online Handwritten Japanese Character String Recognition Incorporating Geometric Context, " Proc. Ninth Int'l Conf. Document Analysis and Recognition, Curi tiba, Brazil, pp. 521-525.

Background Art Information (Concise Explanations for Cite No. 3-5), Toshiba, Jul. 11, 2012 & Jul. 12, 2012.

Final Office Action for corresponding Japanese Application No. 2012-121305, dated Dec. 16, 2014, 8 pages.

First Office Action for corresponding Japanese Application No. 2012-121305, mailed Oct. 6, 2015, 6 pages including translation.

* cited by examiner

HANDWRITTEN DOCUMENT RETRIEVAL APPARATUS AND METHOD

CROSS-REFERENCE TO RELATED APPLICATIONS

This application is based upon and claims the benefit of priority from Japanese Patent Application No. 2012-121305, filed May 28, 2012, the entire contents of which are incorporated herein by reference.

FIELD

Embodiments described herein relate generally to a handwritten document retrieval apparatus and method.

BACKGROUND

There is known a document retrieval apparatus for retrieving a document, which is similar to or matches with a handwritten query input or designated by a user, from a database.

DETAILED DESCRIPTION

A handwritten document retrieval apparatus according to an embodiment will now be described in detail with reference to the accompanying drawings. In the embodiment to be described below, it is assumed that components designated by the same numeral operate in the same manner, and an overlapping description is omitted.

In general, according to one embodiment, a handwritten character retrieval apparatus is provided with an acquisition unit, a separation unit, a feature extraction unit and a retrieval unit. The acquisition unit acquires a document including handwriting data. The separation unit separates the document into a plurality of parts. The feature extraction unit extracts feature values, each indicating a feature value of each part. The retrieval unit executes retrieval based on the feature values.

According to the embodiment, an increase in processing time and memory amount can be prevented even if the number of strokes, which are retrieval targets, increases.

In the embodiment, retrieval is executed from (for example, many) handwritten documents which are written in advance, by using a handwritten document (including handwriting data) which was handwritten by a user as a query. Any method may be used for the user to designate a document. For example, the query may be designated by the user actually handwriting a document. The user may create a document by arranging one or more pre-prepared templates of strokes on a layout. A document, which is to be used as the query, may be selected by the user from among existing handwritten documents. A combination of these methods may be used.

In addition, in the embodiment, in the determination of the degree of similarity between a query and a handwritten document, a layout of a handwritten document is used. Note that the stroke refers to a stroke (e.g., one pen stroke or one stroke in a character) which has been input by handwriting, and represents a locus of a pen or the like from the contact of the pen or the like with an input surface to the release thereof.

Besides, in the embodiment, it is assumed that a handwritten document having a layout, which is similar to or matches with a query, is presented as a retrieval result.

Figure 1:
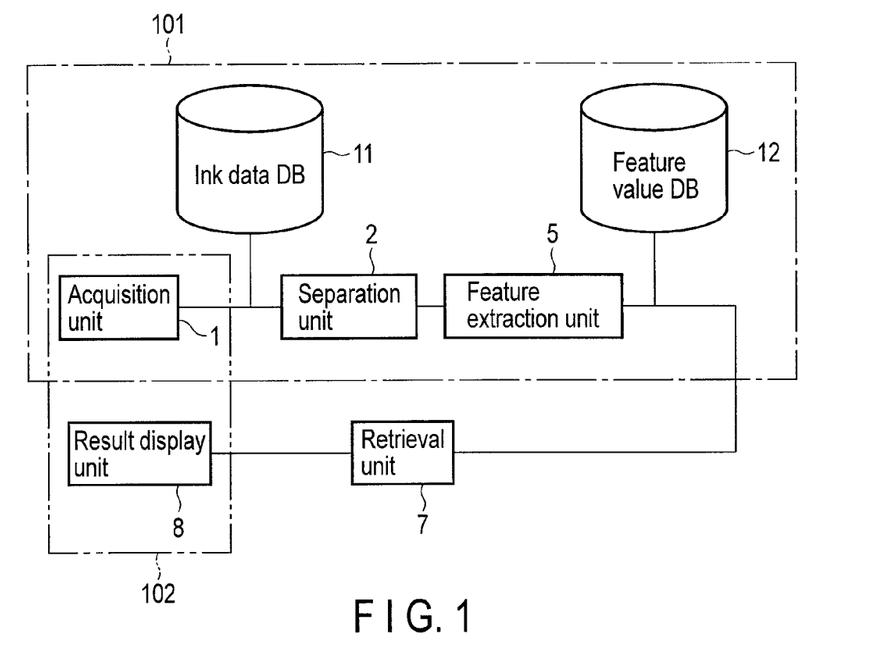
FIG. 1 is an exemplary block diagram showing a handwritten document retrieval apparatus according to an embodiment.

FIG. 1 illustrates an exemplary block diagram of the handwritten document retrieval apparatus according to the embodiment. As shown in FIG. 1, the handwritten document retrieval apparatus of the embodiment includes an acquisition unit 1, a separation unit 2, a feature extraction unit 5, a retrieval unit 7, a result display unit 8, an ink data database (ink data DB) 11, and a feature value database (feature value DB) 12.

The ink data DB 11 stores ink data in which strokes are put together in units of a document.

The feature value DB 12 stores a feature value based on a result of separation of the document into a plurality of parts. The parts, in this context, refer to, for example, a graphic part, a table part, a character part, a line block, a character block, etc., which will be described later in detail.

The acquisition unit 1 is configured to acquire a handwritten character string which is used as a query.

The description below is mainly given of the case in which a stroke, which is handwritten by the user, is acquired. As the method of input by handwriting, use may be made of various methods, such as a method of input by a pen on a touch panel, a method of input by a finger on the touch panel, a method of input by a finger on a touch pad, a method of input by operating a mouse, and a method by an electronic pen.

A stroke group (ink data), which is handwritten by the user, is stored in ink data DB 11, for example, when the user finishes writing a document or saves a document. The ink data is a data structure for storing a stroke group in units of a document, etc.

The separation unit 2 executes a separation process of separating a handwritten document (ink data) into a plurality of parts and extracting separation information. The separation information, which will be described later in detail, is information which can specify respective parts obtained from the handwritten document.

The feature extraction unit 5 extracts, from the separation information obtained by the separation unit 2, feature values which describes the features of the document (the feature relating to plural parts of the document).

The retrieval unit 7 retrieves a similar document by calculating the degree of similarity between documents by using the extracted feature value.

The result display unit 8 presents a retrieval result.

Figure 2:
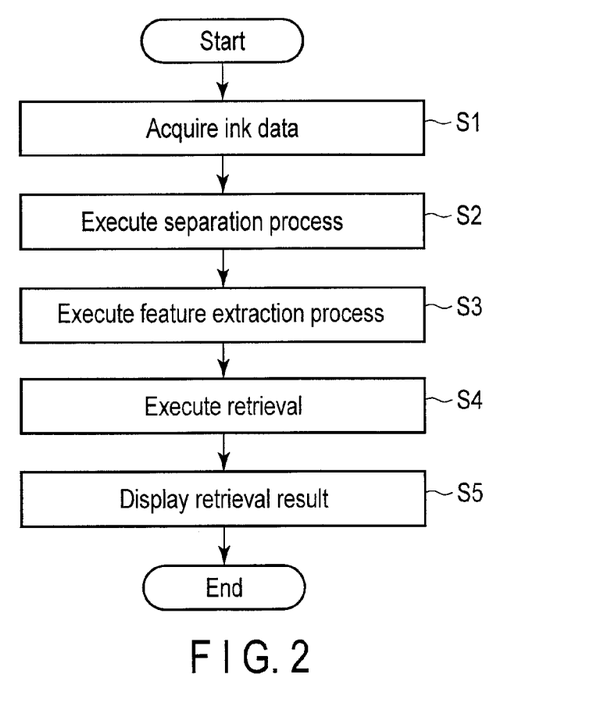
FIG. 2 is an exemplary flowchart illustrating a processing of the handwritten document retrieval apparatus.

FIG. 2 illustrates an example of the process of the handwritten document retrieval apparatus of the embodiment.

In step S1, the acquisition unit 1 acquires a handwritten document (handwritten stroke) which is to be used as a query.

In step S2, the separation unit 2 extracts separation information with respect to the acquired handwritten document (i.e. executes a separation process).

In step S3, the feature extraction unit 5 executes a feature extraction process with respect to the acquired handwritten document, based on the result of the separation process.

In step S4, the retrieval unit 7 executes retrieval, based on the feature value obtained by the feature extraction unit 5.

In step S5, the result display unit 8 displays the retrieval result obtained by the retrieval unit 7.

Figure 3:
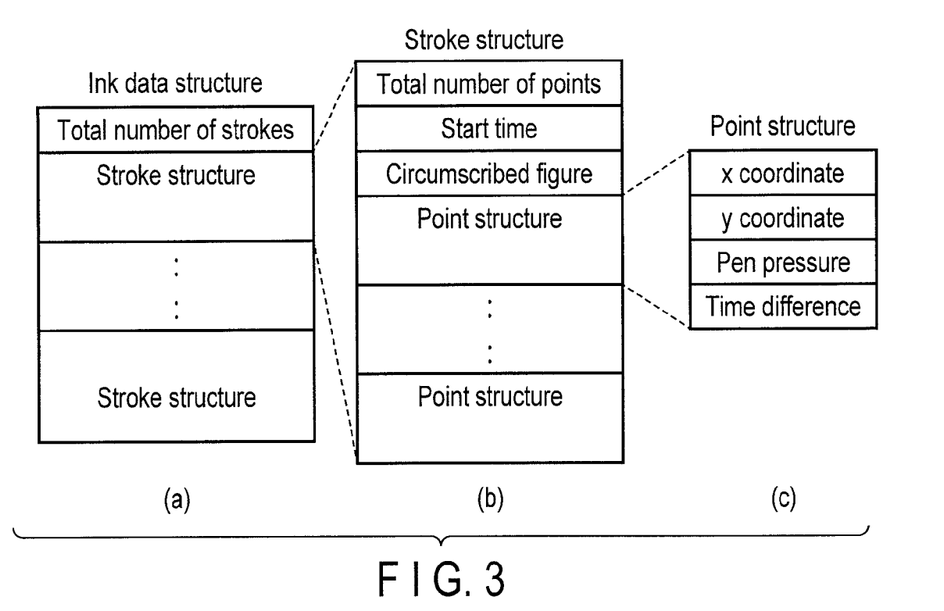
FIG. 3 is a view illustrating an example of a format of ink data.

Next, referring to FIG. 3, a description is given of the data structure of ink data and the data structure of stroke data.

Usually, a stroke is sampled such that points on a locus of the stroke are sampled at a predetermined timing (e.g. at regular time intervals). Thus, the stroke is expressed by a series of sampled points.

In an example of part (b) of FIG. 3, a stroke structure of one stroke (i.e., one handwritten stroke) is expressed by a set of coordinate values (herein after called "point structure") on a plane on which a pen has moved. Specifically, the stroke structure is a structure including "total number of points" indicative of the number of points constituting the stroke, "start time", "circumscribed figure", and an array of "point structures", the number of which corresponds to the total number of points. The start time indicates a time point at which the pen was put in contact with the input surface to write the stroke. The circumscribed figure indicates a circumscribed figure for a locus of the stroke on the document plane (preferably, a rectangle of a smallest area including the stroke on the document plane).

The structure of a point may depend on an input device. In an example of part (c) of FIG. 3, the structure of one point is a structure having four values, namely coordinate values x and y, at which the point was sampled, a writing pressure, and a time difference from an initial point (e.g. the above-described "start time").

The coordinates are a coordinate system on the document plane, and may be expressed by positive values which become greater toward a lower right corner, with an upper left corner being the origin.

In addition, when the input device is unable to acquire a writing pressure or when a writing pressure, even if acquired, is not used in a subsequent process, the writing pressure in part (c) of FIG. 3 may be omitted or data indicative of invalidity may be described for the writing pressure.

In the examples of parts (b) and (c) of FIG. 3, actual data, such as coordinate values x and y, may be described in section of each point structure in the stroke structure. Alternatively, assuming that the data of the stroke structure and the data of the point structure are separately managed, link information to the corresponding point structure may be described in the section of each point structure in the stroke structure.

Figure 4:
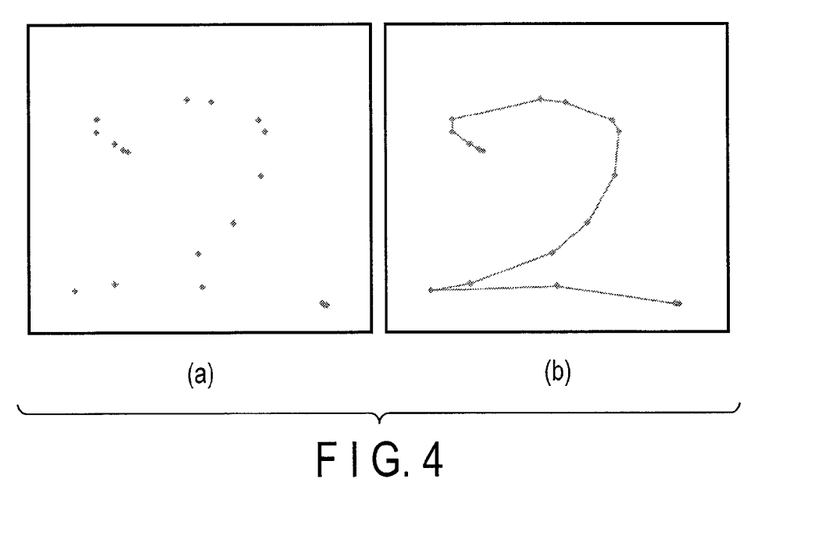
FIG. 4 is an exemplary view for illustrating the input of stroke data.

FIG. 4 illustrates an example of a stroke which is acquired. In the description below, for example, the case is assumed that the sampling cycle of sample points in the stroke is constant. Part (a) of FIG. 4 shows coordinates of sampled points, and part (b) of FIG. 4 shows temporally successive point structures which are linearly interpolated. The difference in intervals of coordinates of sampling points is due to the difference in speed of writing. The number of sampling points may differ from stroke to stroke.

In an example of part (a) of FIG. 3, the data structure of ink data is a structure including "total number of strokes" indicative of the number of stroke structures included in the entire area of the document, and an array of "stroke structures", the number of which corresponds to the total number of strokes.

In the examples of parts (a) and (b) of FIG. 3, the data of part (b) of FIG. 3 may be described in the part of each stroke structure in the ink data structure. Alternatively, assuming that the data of the ink data structure and the data structure of the stroke of part (b) of FIG. 3 are separately managed, link information to the corresponding data of part (b) of FIG. 3 may be described in the part of the data structure of each stroke in the ink data structure.

The stroke data, which has been written by the user by using the input device, is deployed on the memory, for example, by the ink data structure shown in FIG. 3. The ink data is stored as ink data DB 11, for example, when the ink data is saved as a document.

Incidentally, when pluralities of documents are stored, document IDs for identifying these documents may be saved in association with each ink data. In addition, in order to identify each stroke, a stroke ID may be imparted to each stroke structure.

Next, the separation unit 2 is described.

The separation unit 2 executes a separation process of separating one stored handwritten document (ink data) into a plurality of parts, based on the positional relationship and attributes of strokes on the document plane.

Figure 5:
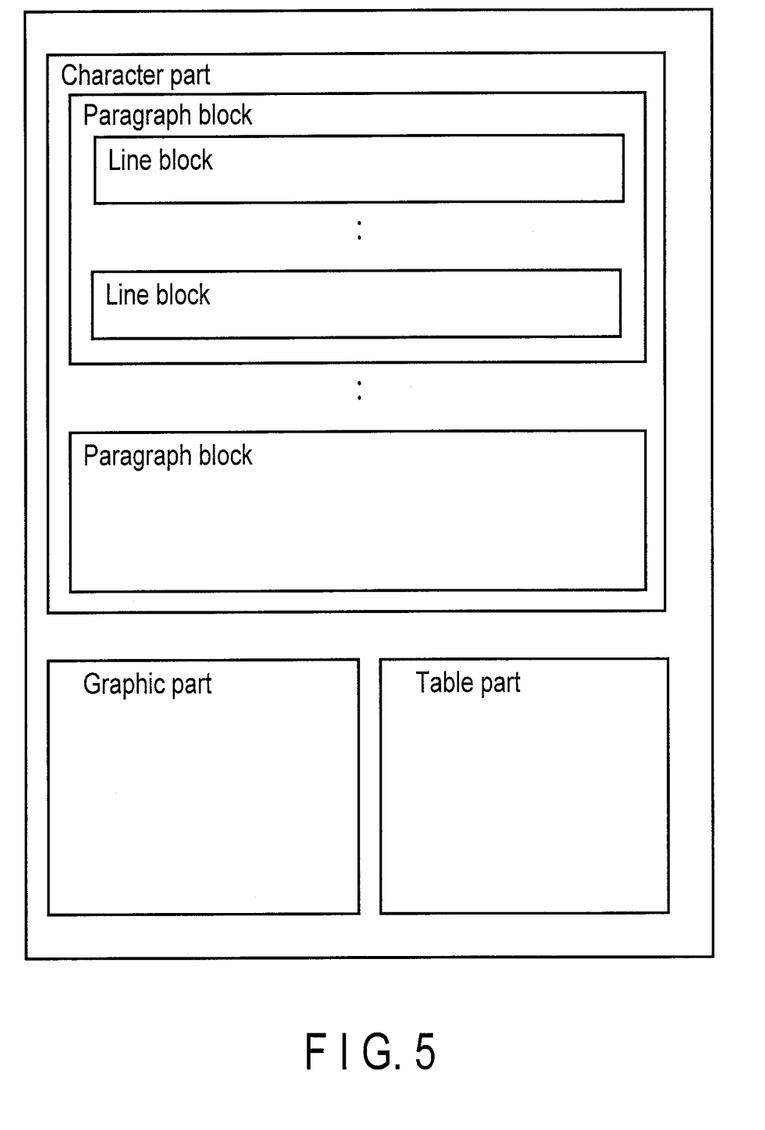
FIG. 5 is an exemplary view for illustrating the separation of stroke data.
Figure 6:
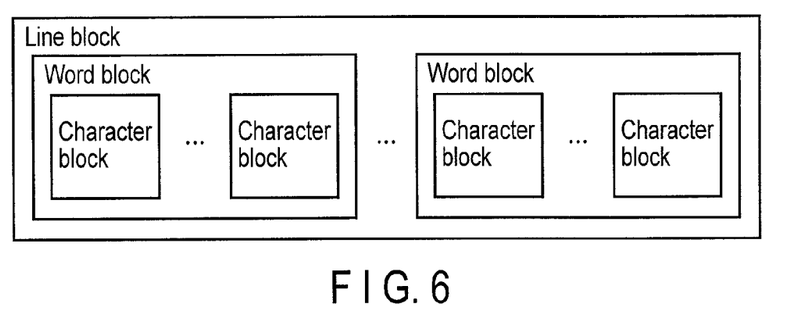
FIG. 6 is an exemplary view for illustrating the separation of stroke data.
Figure 7:
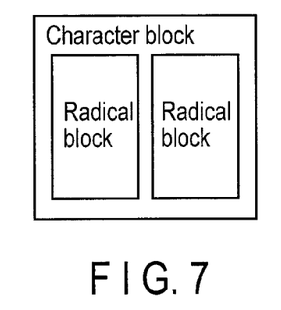
FIG. 7 is an exemplary view for illustrating the separation of stroke data.

Referring to FIG. 5 to FIG. 7, an example of the separation into plural parts is described.

For example, a handwritten document is first separated into a character part, and a part other than the character part. Preferably, as shown in FIG. 5, the handwritten document is mainly separated into three parts, namely units of "character part", "graphic part" and "table part".

An internal part of each "character part" may further be separated into a plurality of parts. For example, as shown in FIG. 5, the "character part" may be separated into "paragraph blocks", and the "paragraph block" may be separated into "line blocks". Further, as shown in FIG. 6, the "line block" may be separated into "word blocks", and the "word block" may be separated into "character blocks". Furthermore, as shown in FIG. 7, the "character block" may be separated into "radical blocks". (Radical block is a part of Chinese Character. "Radical" use for classifying of Chinese Character. If some character separate small fragments, one of the fragments may be used as radical block.) When all of these parts are used, eight kinds of parts are present. However, it is possible to use only a part which is arbitrarily selected from among these parts.

Figure 8:
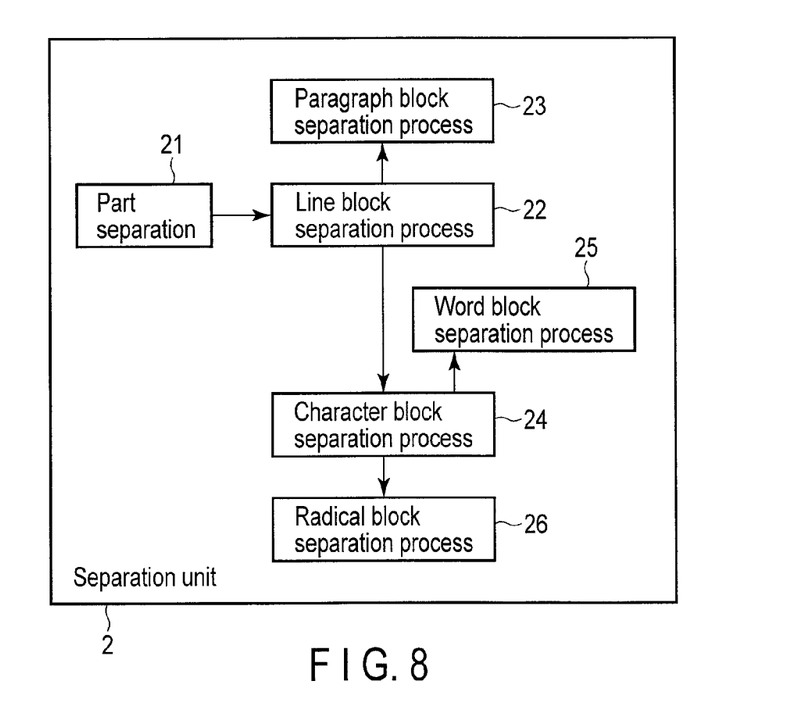
FIG. 8 is an exemplary block diagram showing a separation unit.

Next, referring to FIG. 8, an example of the separation process is described. FIG. 8 illustrates an exemplary block diagram of internal functional blocks or internal processes of the separation unit 2.

To start with, a handwritten document is separated into units of a character part, a graphic part and a table part (part separation unit or part separation process 21).

For example, using a classifier which is pre-learnt to determine which of a character, a graphic and a table each of strokes belongs to, the likelihood is calculated with respect to each stroke and is expressed by Markov random field (MRF) in order to couple with spatial proximity and continuity on a document plane. Strokes may be separated into a character part, a graphic part and a table part (see, e.g. X.- D. Zhou, C.-

L. Liu, S. Ouiniou, E. Anquetil, "Text/Non-text Ink Stroke Classification in Japanese Handwriting Based on Markov Random Fields" ICDAR '07 Proceedings of the Ninth International Conference on Document Analysis and Recognition, vol. 1, pp. 377-381, 2007).

The classification into the character part, graphic part and table part is not limited to the above method.

After the handwritten document is separated into the character part, graphic part and table part, the character part is further separated into detailed parts.

To begin with, in the embodiment, separation into a part of a line block is executed (line block separation unit or line block separation process 22).

Each stroke data includes time information indicative of a time of writing. Thus, for example, with respect to a stroke which is sorted in the order of writing, if the distance between circumscribed rectangles of successive strokes is less than a threshold, these strokes may be determined to belong to the same line block. If the distance is equal to or greater than the threshold, these strokes may be determined to belong to different line blocks.

$$LineClassification(i) = \begin{cases} true, & \text{if } Dist(SR_{i-1}, SR_i) < threshold_{line} \\ false, & \text{otherwise} \end{cases}$$

The above equation is a function for determining whether an i-th stroke belongs to the same line as an immediately preceding stroke. $SR_i$ indicates the circumscribed rectangle of a stroke, and Dist (r1, r2) is a function for returning a distance between circumscribed rectangles r1 and r2. In this case, the distance between circumscribed rectangles is an Euclidean distance between gravity points of circumscribed rectangles. In addition, the threshold $threshold_{line}$ is a predetermined parameter, and varies in relation to the range of a document plane on which writing is possible. It should suffice if it is understood that the range in the x-axis direction of stroke position data of a character string or the like has greatly varied, and the threshold may be set at, e.g. 30% of the range of the x axis of target ink data.

In the meantime, the stroke corresponding to a line block is not necessarily written in parallel to the axis. Thus, in order to absorb the rotation of writing, the direction of the line block may be normalized to one of three directions, namely a leftward direction, a downward direction and a rightward direction. On the document plane, a first principal component is found by principal component analysis of a line block, and the eigenvector thereof is compared to the above-described three directions, and the line block is rotated to the closest direction of the three directions. Note that when the language of writing can be specified, the direction of normalization can be limited. For example, in the case of Arabic, the direction of the line block is limited to the leftward direction. In the case of Japanese, the direction of the line block is limited to two directions, i.e. the rightward direction and downward direction.

The separation of the line block is not limited to the above method.

Next, separation into the part of the paragraph block is executed (paragraph block separation unit or paragraph block separation process 23).

For example, on the document plane, all strokes are projected with respect to the direction of the short side of the part of the line block, thereby obtaining a histogram in which the frequency of strokes in a fixed range is calculated. The obtained histogram has a multimodality, and each peak is classified as one paragraph block. Since the total of peaks is unknown, clustering is executed by using the condensability of frequency and the distance on the axis of projection, and thereby peaks of multimodality can be divided (see, e.g. Imamura, Fujimura, Kuroda, "A Method of Dividing Peaks in Histograms Based on Weighted Sequential Fuzzy Clustering", Journal of the Institute of Image Information and Television Engineers, 61(4), pp. 550-554, 2007).

The separation of the paragraph block is not limited to the above method.

Next, separation into the part of the character block is executed (character block separation unit or character block separation process 24).

For example, a median of the short side of the circumscribed rectangle of the part of the line block, which has been separated by the above-described method, is set to be the size of one character, and separation is executed for each line block part. An AND process of circumscribed rectangles of strokes is executed in the order of writing, and a coupled rectangle is obtained. At this time, if the coupled rectangle is larger than the character size in the long-side direction of the part of the line block, a target stroke may be determined to belong to the part of a character block which is different from a character block of an immediately preceding stroke. Otherwise, the target stroke may be determined to belong to the same character block.

The separation of the character block is not limited to the above method.

Next, separation into the part of the word block is executed (word block separation unit or word block separation process 25).

The "word" in this context refers to, for example, not a word which is divided by parts of speech by morphological analysis, but a part which is more detailed than a line block and is broader than a character block. Since character recognition is indispensable for exact classification of a word, the word block does not necessarily become a word having a meaning as text information. The part of the word block may be calculated, for example, such that for the part of the line block, the character block parts belonging to the part of the line block are clustered with respect to the coordinate values of the circumscribed rectangle for the part of the character block and are separated into a k-number of clusters, and each cluster is determined to be the part of the word block.

The separation of the word block is not limited to the above method.

Next, in the case where one character is constituted by a plurality of strokes of a Chinese character or the like, separation into the radical block is executed for separation into a more detail part (radical block separation unit or radical block separation process 26).

With respect to the character block which has been separated by the above method, the same process as for the character block classification by the threshold is executed.

The classification of the radical block is not limited to the above-described method.

In the above-described process example, the separation of the paragraph block and the separation of the character block/word block/radical block can be executed independently (these separations can be executed in an order different from the above-described one, or may be executed in parallel). In addition, the separation of the word block and the separation of the radical block can be executed independently (these separations can be executed in an order different from the above-described one, or may be executed in parallel).

Various kinds of formats of separation information are applicative.

For example, the separation information may include, with respect to each part, a combination of a part label indicative of the kind of the part and information (e.g. stroke ID) indicative of one or plural strokes included in the part.

For instance, when eight kinds of separations are used in the above-described example, the part label is a label indicative of "graphic part", "table part", "character part", "paragraph block", "line block", "word block", "character block", or "radical block".

For example, separation information relating to a certain line block may include a label "line block" and stroke IDs of all strokes included in the line block.

Note that the separation information may include, with respect to each part, a combination of a part label and information indicative of a range of the part (in the coordinate system of the document plane), for example.

The information indicative of the range of the part is, for instance, a parameter which specifies a circumscribed rectangle for the part (all strokes included in the part).

For instance, separation information relating to a certain line block may include a label "line block" and coordinate values of two diagonal apices of the circumscribed rectangle for the line block.

In addition, for example, the separation information may include, with respect to each part, a combination of the above-described three information items, that is, a combination of the part label indicative of the kind of the part, the information indicative of one or plural strokes included in the part, and the information indicative of the range of the part.

Next, the feature extraction unit 5 is described.

The feature extraction unit 5 extracts feature values based on a plurality of parts, by using the separation information of a handwritten document.

The feature value based on the plural parts of the document is, for instance, a feature value including, with respect to the respective parts separated by each criterion, combinations of "part labels" indicative of the kinds of the parts, and the "part data" for the parts. In the case where the eight separations are used in the above-described example, when all the eight separations have been extracted, the feature value (feature vector) is, for instance, like {(graphic part label, part data), (table part label, part data), (paragraph block label, part data), . . . , (paragraph block label, part data), (line block label, part data), . . . , (line block label, part data), (word block label, part data), . . . , (word block label, part data), (character block label, part data), . . . , (character block label, part data), (radical block label, part data), . . . , (radical block label, part data)}. Note that since the total number of parts obtained by the separation process may differ from handwritten document to handwritten document, the feature value becomes a variable-length vector.

In this case, the part data is, for example, a parameter which can specify, by a predetermined method, the range of the part (occupied in the coordinate system of the document plane).

For instance, the part data may be data which specifies the circumscribed figure for all strokes included in the part (e.g. all strokes included in the line block). For example, the part data may be a pair of the coordinates of the apex closest to the origin (the upper left corner in the coordinate system of the document plane) of all the apices of the circumscribed rectangle and the coordinates of the apex farthest from the origin, or may be a pair of the coordinates of two other diagonal apices.

As the circumscribed figure indicative of the range of the part, a figure other than the circumscribed rectangle may be used. For example, a predetermined polygon including all strokes included in the part may be used.

In addition, for example, the method of specifying the range of the part may be made different in accordance with the kind of the part.

The feature extraction unit 5 extracts the feature value based on plural parts according to a predetermined format by using the separation information of the handwritten document (and by referring to the ink data DB 11, where necessary).

The feature value extracted by the feature extraction unit 5 is stored as the feature value DB 12.

Figure 9A:
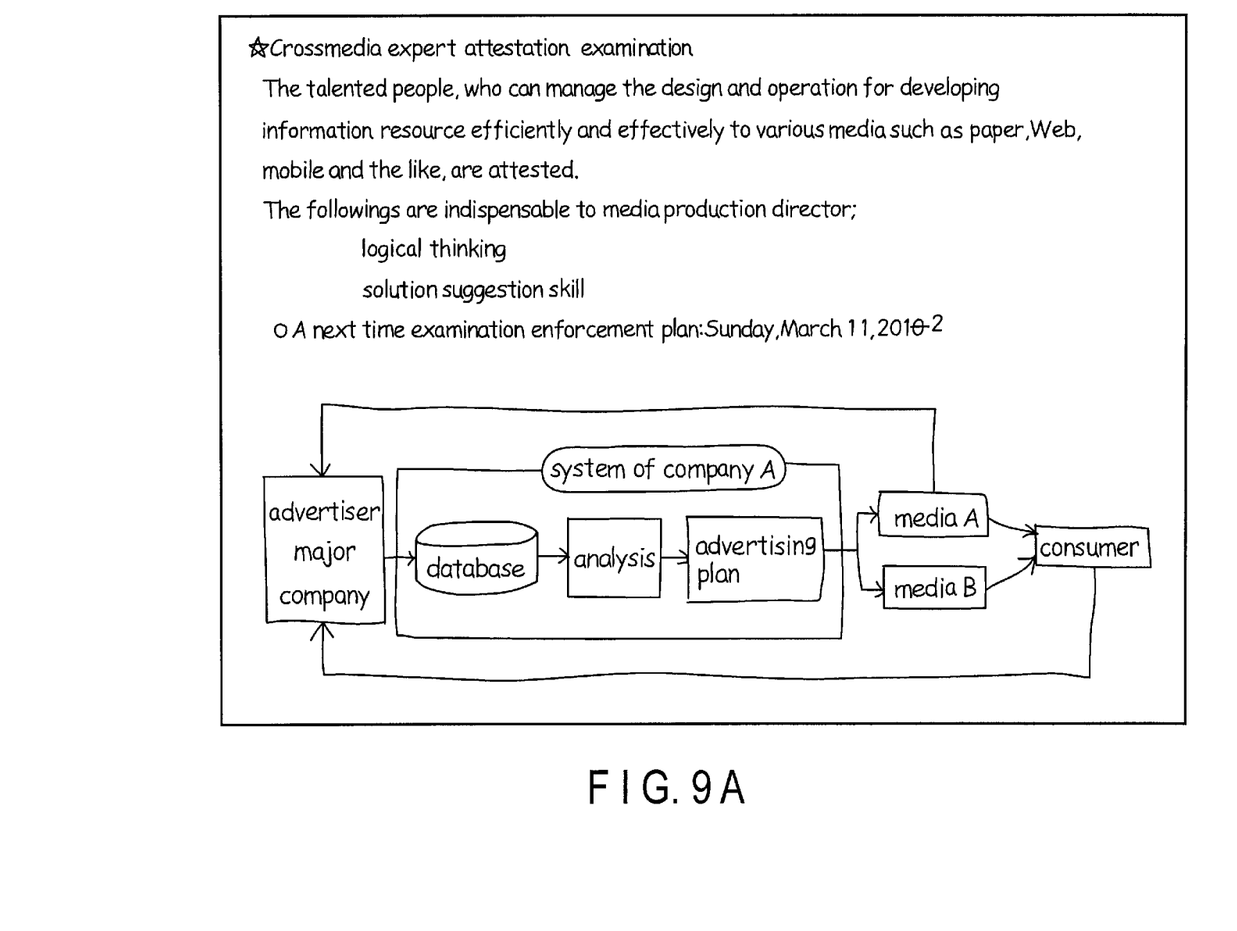
FIGS. 9A-9B illustrate an example of separation.
Figure 9B:
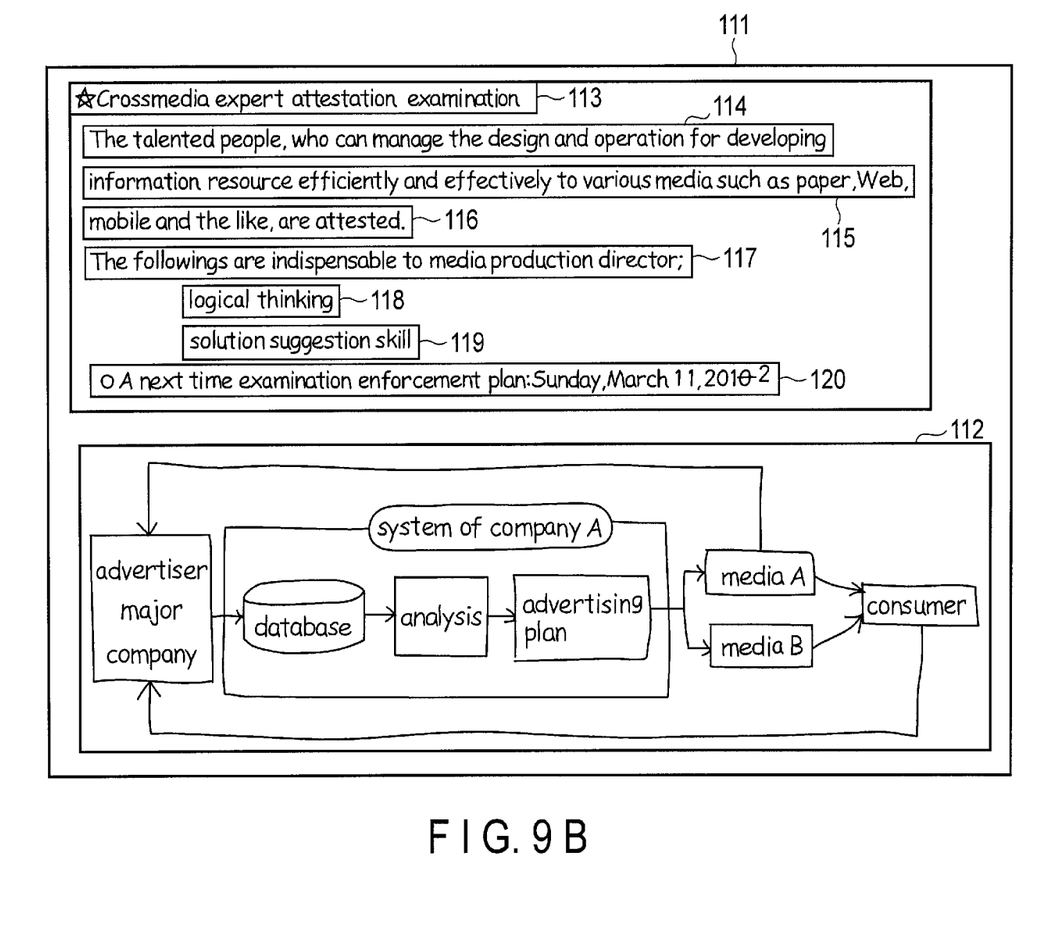

FIGS. 9A-9B illustrate a concrete example of separation and feature value extraction. FIG. 9A illustrates a handwritten document (stroke) designated as a query by the user. FIG. 9B illustrates a process result of this handwritten document. In FIG. 9B, numeral 111 designates a character part, 112 designates a graphic part, and 113 to 120 designate character string blocks. In this case, the feature value includes the extracted parts 111 to 120 and the part data thereof.

Figure 10:
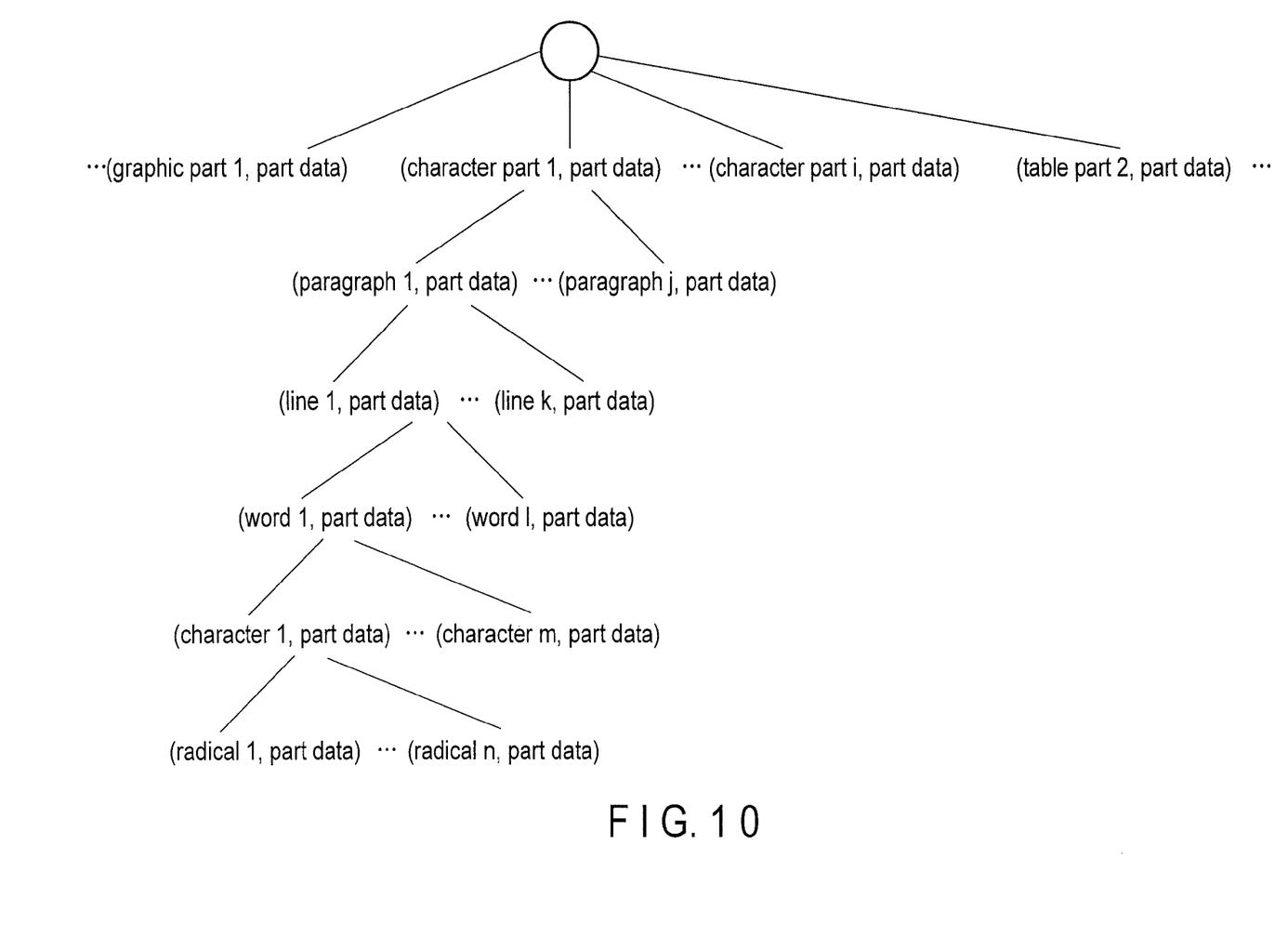
FIG. 10 is a view for illustrating an example of a feature value.

For example, as illustrated in FIG. 10, when the feature value is stored as the feature value DB 12, the feature value may be stored as a tree structure according to the inclusive relation between the respective parts or blocks (FIG. 10 shows only a part of data).

Next, the retrieval unit 7 is described.

The retrieval unit 7 retrieves a handwritten document which is similar to a handwritten document that is designated by the user, for example, by using the feature value (feature vector) extracted by the above-described method.

Various methods can be used for matching between feature vectors.

For instance, the retrieval unit 7 may retrieve a similar document by calculating the degree of similarity between handwritten documents by using the extracted feature value. The calculation of the degree of similarity in this case is defined, for example, by the following equation.

$$Sim = \frac{\sum_{i=1}^{N_t} \sum_{j=1}^{N_q} \eta_{i,j} Rect(St_i \wedge St_j)}{Rect_{Inc}}$$

where $N_t$ and $N_g$ indicate numbers of parts of handwritten documents, respectively. $\eta_{i,j}$, indicates a scalar value of 1 when i and j are the same part label, and indicates a scalar value of 0 in other cases. $S_t$ indicates each part. $Rect_{inc}$ indicates the part of ink data.

A logical product (a confluence area) is found with respect to parts having the same part label, and the sum of the square measures of the common areas is normalized by the square measure of the handwritten document, thereby calculating the degree of similarity.

The degrees of similarity between the handwritten document designated by the user and all stored handwritten documents are calculated, and the calculated degrees of similarity are sorted in a descending order, thus obtaining a retrieval result.

Aside from the above, various matching methods can be used.

When the retrieval unit 7 provides a retrieval result to the result display unit 8, the retrieval unit 7 may output all results or may output, instead, for example, upper K results based on the degree of similarity. Alternatively, the retrieval unit 7 may output results with degrees of similarity which are a threshold or more, or may output K results at maximum with degrees of similarity which are a threshold or more. Alternatively, other methods may be used.

Next, the result display unit 8 is described.

The result display unit 8 presents the retrieval result, which has been provided from the retrieval unit 7, to the user.

Various methods can be used as the display method of the retrieval result.

Figure 11:
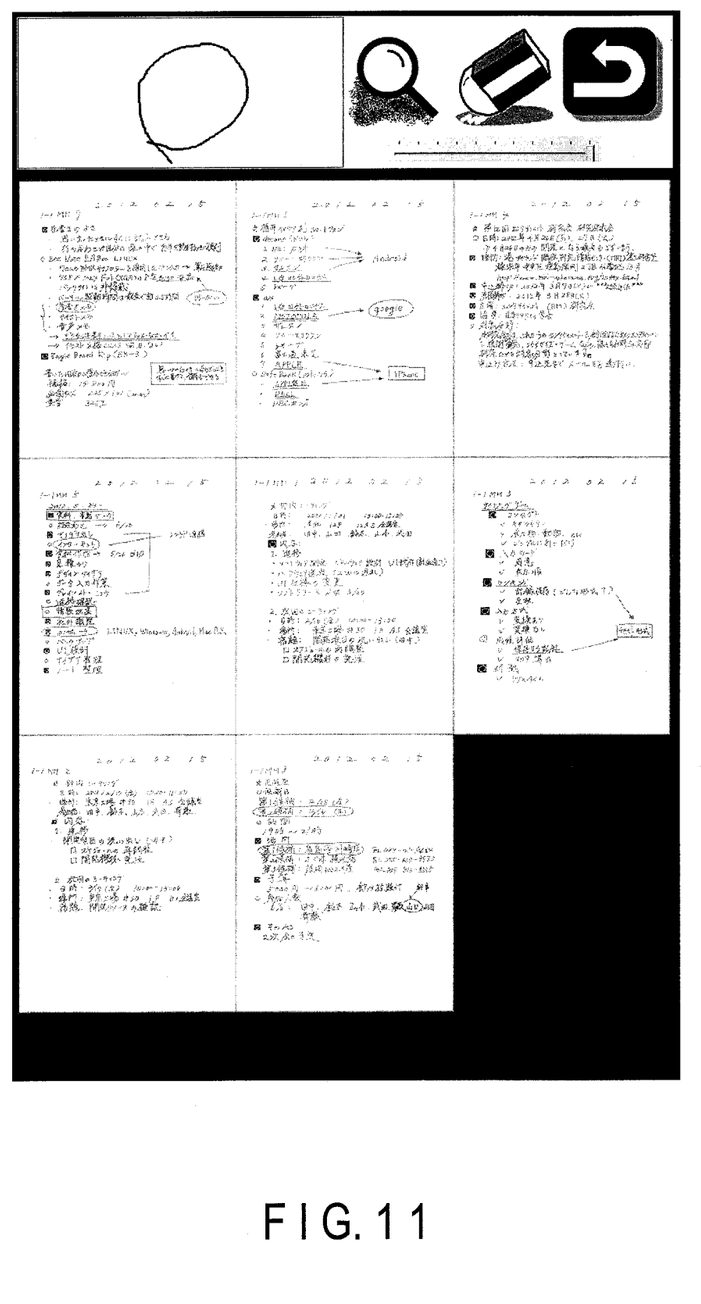
FIG. 11 is a view illustrating an example of retrieval result display.

For example, as illustrated in FIG. 11, the screen of the display device may be divided into tiles, and thumbnails of documents, which are reduced in size, may be displayed on the respective tiles.

At this time, the thumbnails of documents may be arranged, for example, in a display order beginning with one including a stroke having a high degree of similarity of the retrieval result.

In addition, in the thumbnail, frames indicating various kinds of parts may be displayed.

Note that as the method in which the user designates the query (handwritten document), various methods can be used, other than the method in which the user directly inputs the query by handwriting.

Figure 12A:
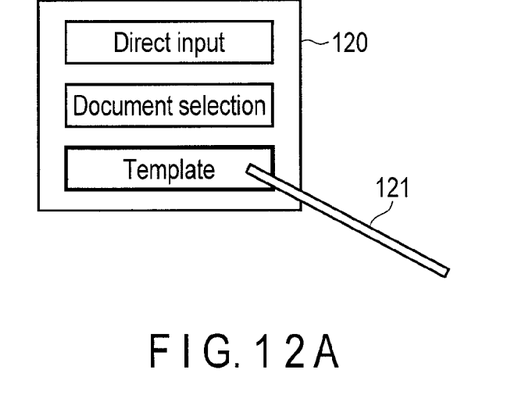
FIGS. 12A-12B illustrate various input methods.

For example, as illustrated in part FIG. 12A, three choices, "direct input", "document selection" and "template", may be displayed on a select menu 120, and a desired input method may be selected by the user by, for example, a pen 12.

Figure 12B:
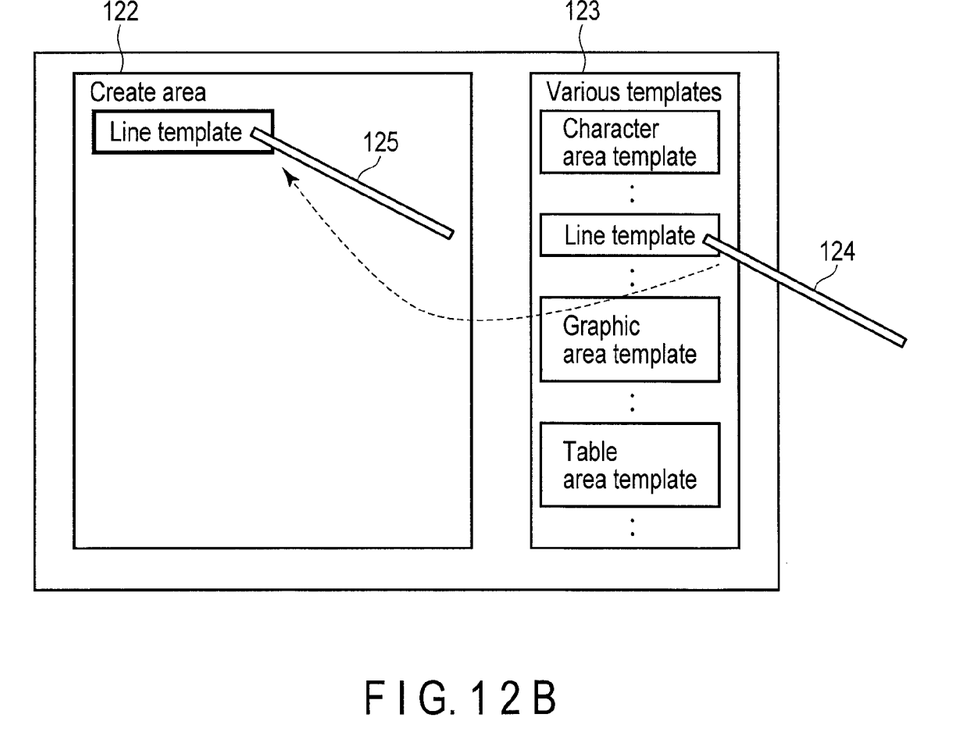

When "direct input" has been selected, the user actually inputs a document by handwriting on a create area 122 shown in FIG. 12B, for example, by using the pen 121. The acquisition unit 1 creates ink data, based on a stroke which was handwritten by the user.

When "document selection" has been selected, the user selects a desired handwritten document, for example, from among exiting handwritten documents which are stored in the document retrieval apparatus, or from among exiting handwritten documents which can be obtained from the external by the document retrieval apparatus. In this case, it should suffice if the acquisition unit 1 acquires ink data of an existing handwritten document.

When "template" has been selected, for example, as illustrated in FIG. 12B, various templates 123, which are prepared in advance, are displayed (each template is a model of a stroke corresponding to any one of parts). The user selects, for example, a desired one from the various templates 123 (see "124" in FIG. 12B), and arranges the selected template at a desired position on the create area 122 in FIG. 12B (see "125" in FIG. 12B). By repeating this operation as needed, the user creates a query. In this case, it should suffice if the acquisition unit 1 forms ink data from templates disposed on the create area 122.

Next, variations of the present embodiment are described.

The retrieval unit 7 of the handwritten document retrieval apparatus of the embodiment may use, as retrieval targets, handwritten documents which are stored in the handwritten document retrieval apparatus. Alternatively, when the handwritten document retrieval apparatus is connectable to a network such as an intranet and/or the Internet, the retrieval unit 7 may use, as retrieval targets, handwritten documents which can be accessed via the network. Alternatively, the retrieval unit 7 may use, as retrieval targets, handwritten documents which are stored in a removable memory that is connected to the handwritten document retrieval apparatus. Besides, retrieval targets may be an arbitrary combination of these handwritten documents. It is desirable that as regards these handwritten documents, at least the same feature values as the feature values, which are used in the retrieval in the embodiment, are associated and stored.

The handwritten document retrieval apparatus of the embodiment may be configured as a stand-alone apparatus, or may be configured such that the handwritten document retrieval apparatus is distributed to a plurality of nodes which are communicable via a network.

The handwritten document retrieval apparatus of the embodiment can be realized by various devices, such as a desktop or laptop general-purpose computer, a portable general-purpose computer, other portable information devices, an information device with a touch panel, a smartphone, or other information processing apparatuses.

Figure 13:
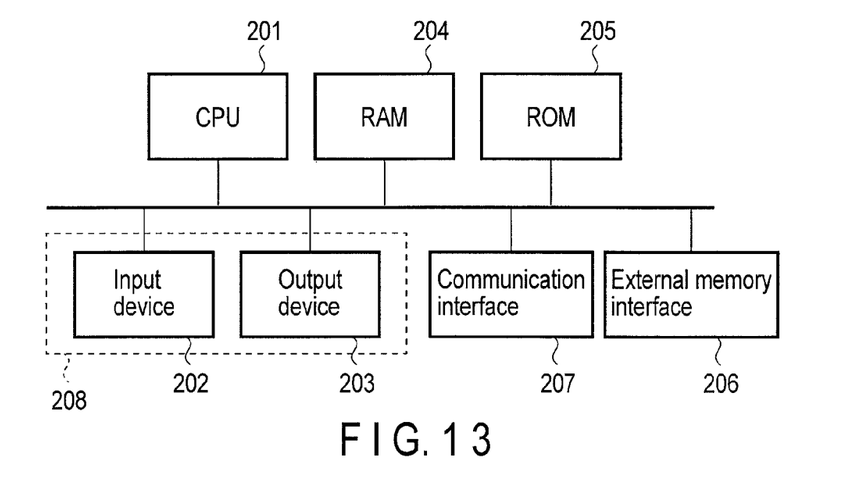
FIG. 13 is an exemplary block diagram showing a hardware configuration.

FIG. 13 illustrates an exemplary block diagram of the hardware which realizes the handwritten document retrieval apparatus of the embodiment. In FIG. 13, numeral 201 is a CPU, 202 is an appropriate input device, 203 is an appropriate output device, 204 is a RAM, 205 is a ROM, 206 is an external memory interface, and 207 is a communication interface. For example, when a touch panel is used, use is made of, for instance, a liquid crystal panel, a pen, and a stroke detector which is provided on the liquid crystal panel (see 208 in FIG. 13).

In addition, for example, a part of the structure of FIG. 1 may be provided on a client, and the other part of the structure of FIG. 1 may be provided on a server.

Figure 14:
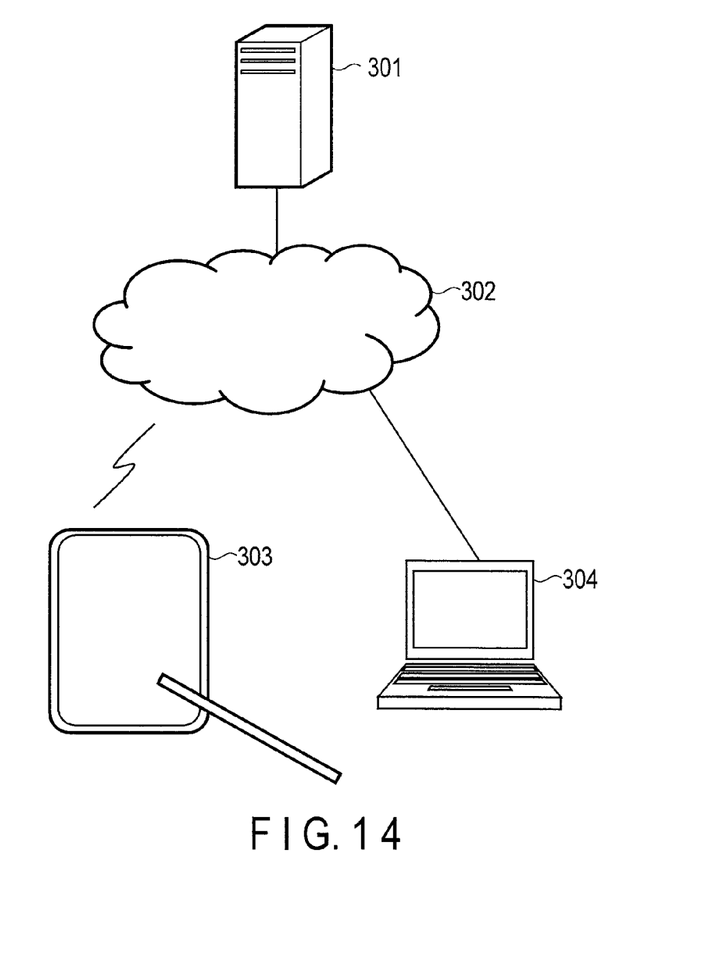
FIG. 14 is a view for describing an exemplary configuration in which a network is involved.

For example, FIG. 14 illustrates a state in which a server 301 exists on a network 302 such as an intranet and/or the Internet, and each client 303, 304 communicates with the server 301 via the network 302, thereby realizing the handwritten document retrieval apparatus of the embodiment.

The case is illustrated that the client 303 is connected to the network 302 by wireless communication and the client 304 is connected to the network 302 by wired communication.

Usually, the client 303, 304 is a user apparatus. The server 301 may be, for example, a server provided on a LAN such as an intra-company LAN, or a server which is operated by an Internet service provider. Besides, the server 301 may be a user apparatus by which one user provides functions to another user.

Various methods are thinkable as a method of distributing the structure of FIG. 1 to a client and a server.

For example, in FIG. 1, the range indicated by 102 may be mounted on the client side, and the other range may be mounted on the server side. Alternatively, only the retrieval unit 7 may be mounted on the server side, and the other range may be mounted on the client side.

Note that an apparatus including the range of 101 in FIG. 1, or an apparatus including a range, which excludes the acquisition unit 1 from 101 in FIG. 1, may be realized. In this case, the apparatus has a function of extracting a feature value from a stroke. In addition, for example, the range indicated by 102 in FIG. 1 may be mounted on the client side, the retrieval unit 7 may be mounted on a first server, and the range, which excludes the acquisition unit 1 from 101, may be mounted on a second server.

Other distribution methods are also possible.

As has been described above, according to the present embodiment, it is possible to prevent an increase in processing time and memory amount even if the number of strokes, which are retrieval targets, increases. To be more specific, for example, a page, in place of a character string, is set as a query which is used for retrieval, and retrieval is executed by using layout information such as a position of a line block or a graphic part in the page as a feature. Thereby, a target page can be retrieved at a high speed with a small memory amount.

The instructions included in the procedures in the above-described embodiments can be executed based on a program as software. Further, the same advantage as obtained by the handwritten character retrieval apparatus of the embodiments can also be obtained by beforehand storing the program in a versatile computing system and reading it. The instructions described in the above-described embodiments are recorded, as a program for causing a computer to execute them, on a recording medium, such as a magnetic disk (a flexible disk, a hard disk, etc.), an optical disk (a CD-ROM, a CD-R, a CD-RW, a DVD-ROM, a DVD±R, a DVD±RW, etc.), a semiconductor memory, or a recording medium similar to them. The recording scheme employed in the recording mediums is not limited. It is sufficient if the computer or a built-in system can read the same. If the CPU of the computer reads the program from the recording medium and executes the instructions written in the program, the same function as in the handwritten character retrieval apparatus of the embodiments can be realized. It is a matter of course that the computer acquires the program via a network.

Further, the OS (operating system) operating on the computer, database management software, middleware such as a network, etc., may execute part of each process for realizing the embodiments, based on the instructions in the program installed from a recording medium into the computer or the built-in system.

Yet further, the recording medium in the embodiments is not limited to a medium separate from the computer or the built-in system, but may be a recording medium into which a program acquired via a LAN, the Internet, etc., is stored or temporarily stored.

In addition, a plurality of mediums, from which programs are read to execute the process steps of the embodiments, may be employed.

The computer or the built-in system in the embodiments are used to execute each process step in the embodiments based on the program stored in the recording medium, and may be a personal computer or a microcomputer, or be a system including a plurality of apparatuses connected via a network.

The computer in the embodiments is not limited to the above-mentioned personal computer, but may be an operational processing apparatus incorporated in an information processing system, a microcomputer, etc. Namely, the computer is a generic name of a machine or an apparatus that can realize the functions of the embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handwritten document retrieval apparatus comprising:
a processor; and
a memory comprising instructions to cause the processor to execute acquisition of a document including handwriting data, the handwriting data including a set of a stroke, the stroke being sampled points on a locus of the stroke sampled at a predetermined timing;
separation of the document into a character part and a part other than the character part;
feature extraction of feature values, each indicating a feature value of each part; and
retrieval of an item including the handwriting character based on the feature values, wherein the separation farther comprises separation of the character part into a line block based on a distance between a preceding stroke and a target stroke,
the feature value includes a combination of a label indicative of a kind of the part and data for the part,
the retrieval uses a degree similarity between handwritten documents, wherein the degree of similarity is calculated by a sum of square measures of common areas being normalized by a square measure of the handwritten document.

2. The apparatus of claim 1, wherein the separation comprises separation of the document into the character part, a graphic part and a table part.

3. The apparatus of claim 1, wherein the separation further comprises separation of the character part into a part or all of hierarchical layers of a paragraph block, a word block, a character block and a radical block.

4. The apparatus of claim 1, wherein the acquisition comprises acquisition of a document including a character string designated by a user, from a handwritten character string which is stored in advance.

5. The apparatus of claim 1, wherein the retrieval comprises retrieval of a handwritten document which is similar to templates which are prepared in advance in accordance with the parts.

6. The apparatus of claim 1, further comprising a display configured to display a retrieval result.

7. A handwritten document retrieval method for a handwritten document retrieval apparatus comprising:
acquiring a document including handwriting data, the handwriting data including a set of a stroke, the stroke being sampled points on a locus of the stroke sampled at a predetermined timing;
separating of the document into a character part and a part other than the character part;
extracting feature values, each indicating a feature value of each part; and
retrieving an item including the handwriting character based on the feature values,
wherein the separating the document further comprises separating the character part into a line block based on a distance between a preceding stroke and a target stroke,
the feature value includes a combination of a label indicative of a kind of the part and data for the part,
the retrieving the item uses a degree similarity between handwritten documents, wherein the degree of similarity is calculated by a sum of square measures of common areas being normalized by a square measure of the handwritten document.

8. A non-transitory computer-readable storage medium having stored thereon a computer program which is executable by a computer, the computer program controlling the computer to execute functions of:
acquiring a document including handwriting data, the handwriting data including a set of a stroke, the stroke being sampled points on a locus of the stroke sampled at a predetermined timing;
separating of the document into a character part and a part other than the character part;
extracting feature values, each indicating a feature value of each part; and
retrieving an item including the handwriting character based on the feature values, wherein the separating the document further comprises separating the character part into a line block based on a distance between a preceding stroke and a target stroke, the feature value includes a combination of a label indicative of a kind of the part and data for the part, the retrieving the item uses a degree similarity between handwritten documents, wherein the degree of similarity is calculated by a sum of square measures of common areas being normalized by a square measure of the handwritten document.

\* \* \* \* \*